US009160835B1

(12) United States Patent
Beckman

(10) Patent No.: US 9,160,835 B1
(45) Date of Patent: Oct. 13, 2015

(54) SYSTEMS AND METHODS FOR COMMUNICATING BETWEEN DEVICES USING QUICK RESPONSE IMAGES

(71) Applicant: Amazon Technologies, Inc., Reno, NV (US)

(72) Inventor: Peter C. Beckman, Falls Church, VA (US)

(73) Assignee: Amazon Technologies, Inc., Reno, NV (US)

( * ) Notice: Subject to any disclaimer, the term of this patent is extended or adjusted under 35 U.S.C. 154(b) by 252 days.

(21) Appl. No.: 13/667,785

(22) Filed: Nov. 2, 2012

(51) Int. Cl.
*H04N 5/232* (2006.01)
*H04N 5/222* (2006.01)
*H04M 1/725* (2006.01)
*H04N 1/00* (2006.01)

(52) U.S. Cl.
CPC ......... *H04M 1/7253* (2013.01); *H04N 1/00307* (2013.01)

(58) Field of Classification Search
CPC ........................................................ H04L 9/32
USPC .............. 348/211.99, 207.99, 333.01–333.11
See application file for complete search history.

(56) References Cited

U.S. PATENT DOCUMENTS 8,405,729 B2 * 3/2013 Jain ............................ 348/207.1
8,572,375 B2 * 10/2013 Bishop et al. ................. 713/168

* cited by examiner

*Primary Examiner* — Tuan Ho
*Assistant Examiner* — Selam Gebriel
(74) *Attorney, Agent, or Firm* — Sutherland Asbill & Brennan LLP

(57) ABSTRACT

This disclosure relates to systems and methods for sending and receiving messages between two user devices using vibration generation and detection techniques. The devices may be placed in proximity to each and initiate a solicitation protocol and a communications protocol routine to establish a vibration communication link. The devices may exchange information using information that is encoded into the vibrations that are transferred from one user device to another user device.

22 Claims, 8 Drawing Sheets

SYSTEMS AND METHODS FOR COMMUNICATING BETWEEN DEVICES USING QUICK RESPONSE IMAGES

BACKGROUND

Peer-to-peer communications are increasingly popular among users of electronic devices. Security for electrical communications enables two or more users to engage in protected conversations. However, exchanging security credentials over a wireless connection is susceptible to eavesdropping and may compromise security when an eavesdropper successfully intercepts the security credentials without being noticed. Security precautions that may prevent eavesdropping would be advantageous to electrical communication users.

Figure 1:
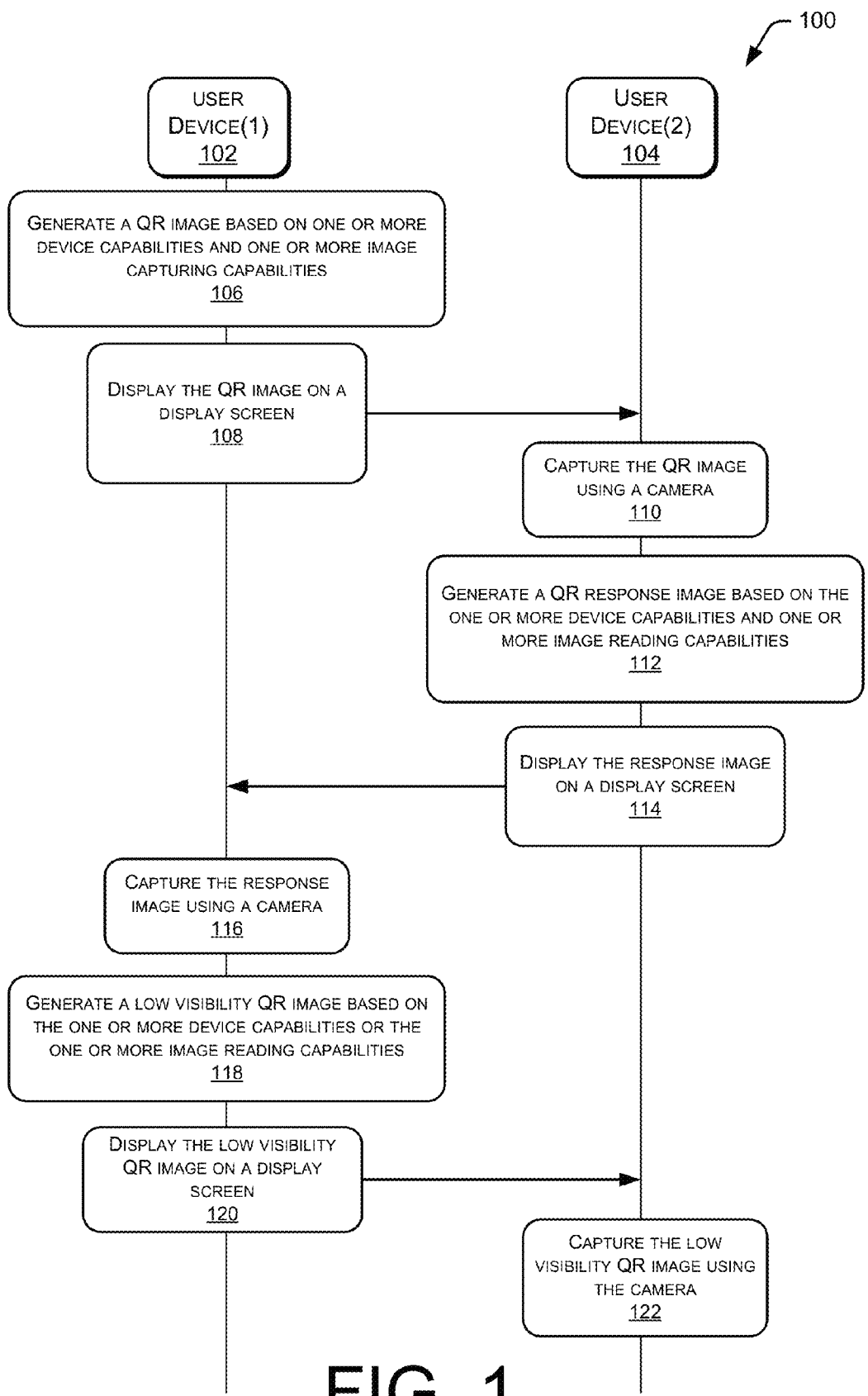
FIG. 1 illustrates a flow diagram for a method for sending and receiving information by displaying an image and capturing the image in accordance with one or more embodiments of the disclosure.

Certain implementations will now be described more fully below with reference to the accompanying drawings in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for sending information between at least two user devices using a display screen and a camera. Images may be encoded with information that include instructions or content that a user wants to share with other users. Broadly, an encoded image may be displayed on the display screen of a first user device and captured by a camera in a second user device. The encoded image may be decoded by the second user device to process and/or display the instructions embedded within the encoded image. In this way, information may be securely provided between the two user devices. The encoded information may not be broadcast over an electrical network and the exchange of information may be limited to the line of sight of the display screen and the camera. The line of sight may be limited by placing the two devices close together so that other observers may not see the display screen of either user device. In certain instances, the images may displayed in a manner that further limits the line of sight for other observers or potential eavesdroppers.

Generally, the image communication techniques may be implemented by variety of user devices that include a display screen and a camera. However, user devices may include different types of display screens and cameras and the user devices may need to determine they are compatible to exchange information using images. Accordingly, the user devices may exchange the capabilities of their respective display screen and camera to facilitate the exchange of information through images. The display screen capabilities may include, but are not limited to, screen size, resolution, brightness, and/or contrast. The camera capabilities may include, but are not limited to, resolution, shutter speed, and/or field of view.

In addition to determining compatibility, the capabilities of the user devices may also enable eavesdropping prevention techniques. This may include adjusting the image resolution, brightness, location and/or size of the image on the display screen, and/or length of time for displaying the image. For example, by increasing the resolution of an encoded image, an eavesdropper may not be able to see or capture enough details within the image to intercept the encoded information. Adjusting the brightness may lower the visibility of the image and make intercepting the image it more difficult for the eavesdropper. The location and/or size of the image may also limit the line of sight visibility of the image. Eavesdropping may also be minimized by limiting the length of time the image is displayed. In one embodiment, the capabilities of the user devices may be shared over a network (e.g., wireless, wired, or peer-to-peer) prior to the exchange of the encoded images. The user devices may use non-visible electromagnetic radiation or an electrical signal over a wired connection to send and receive the capability information. Once the capability information has been used to generate the images, the user device share the images using one or more of the techniques described above.

In one embodiment, the encoded information may include secure information that may provide access to a restricted area, restricted content, or restricted service. For example, the encoded information may include an encryption key that the user devices may use for electrical communications (e.g., wireless, wired, peer-to-peer). In another instance, the encoded information may include payment information that may be exchanges during a retail transaction. For example, the payment information may be sent from a user device to a point of sale device used by the retailer to execute a financial transaction. In another instance, the encoded information may include a request for authentication information that is followed by a response with the authentication information to provide access to the restricted area (e.g., office), restricted content (e.g., pay-per-view entertainment or information), or the restricted service (e.g., financial transactions).

Illustrative System

FIG. 1 illustrates a flow diagram for a method 100 that illustrates one embodiment for exchanging encoded information between a user device(1) 102 and another user device(2) 104 using images displayed on display screens and captured by cameras. The method 100 may begin near the top of the flow diagram and may proceed downward towards the bottom of the flow diagram. The relative position of the flow diagram blocks may indicate the sequence of the method 100. The blocks closer to the top of the flow diagram may indicate that they are performed or executed before the blocks below them. It should be noted that in other embodiments the sequencing of the flow diagram 100 may be altered and some operations may be omitted.

At block 106, the user device(1) 102 may generate a quick response code based, at least in part, on one or more of the capabilities of a display screen in the user device(1) 102 and the capabilities of the camera in the user device(2) 104. In other embodiments, the quick response code may be replaced by any image that displays information or embeds or encodes information into an image. In this embodiment, the information is encoded within the quick response code, but other images (e.g., pictures, shapes) may also be encoded with information.

The quick response code may be a two or three dimensional matrix bar code that may be based on numerical values, alphanumeric values, or binary values. The matrix bar code may be able to accommodate between 3000 and 7000 characters depending on what type of values for the matrix bar code. This may include up to 3000 bytes of information. However, the techniques described herein are not limited to the character or byte limits and may be used to exchange much smaller or larger amounts of information. The quick response code may include any type of information that the user device(1) 102 may send to the other user device(2) 104. Although this method 100 refers to a single quick response code, the quick response codes may be used in sequence to transfer large amounts of information.

The display and camera capabilities will be described in greater detail in the description of FIGS. 2 and 3 below. Briefly, the display and camera capabilities may dictate the characteristics of the image so that both user devices 102, 104 may be able to communicate with each other by displaying and capturing the quick response code images.

At block 108, the user device 102(1) 102 may display the quick response code image on the display screen. The image may be displayed in a manner that limits the line of sight or visibility of the image to prevent eavesdroppers from capturing or seeing the image. For example, the image size may be may be reduced to limit visibility and/or may be displayed in a location that limits visibility to eavesdroppers but may be captured by the camera of the other user device(2) 104. The image location may be at the center of the display, a far corner of the display, or off-center of the display. In certain instances, when more than one image is exchanged, the location and size of the image may change image to image to minimize the chance of successful eavesdropping. In this case, the eavesdropper may be able to see a portion of the display screen but not the entire display screen. By changing the location and size of the images over time, the likelihood that the eavesdropper may intercept all of the images may be lower.

At block 110, the user device(2) 104 may capture the quick response code image displayed by the other user device(1) 102 by using a camera. The image may be stored in memory and decoded to extract the information from the captured quick response code image.

At block 112, the user device(2) 104 may generate a quick response code response image based, at least in part, on the decoded information from the quick response code image, the display capabilities of the user device(2) 104, and the image capturing capabilities of the user device(1) 102. The quick response code response image may include information that was requested by the user device(1) 102 or may acknowledge the receipt and decoding of the quick response code image. In one embodiment, the information may include the capability information of the user device(2) 104 that may enable the user device(1) 102 to generate a low visibility image that may be difficult for eavesdroppers to capture. This may include, but is not limited to, adjusting the resolution, brightness, shutter speed, and/or contrast to create a lower visibility image. The lower visibility image will be discussed in greater detail in the description of FIGS. 4 and 5.

At block 114, the user device(2) 104 may display the response image on the display screen based, at least in part, the capabilities of the user device 102, 104 or image communication instructions (e.g., resolution, brightness . . . ) that may have been exchanged between the user devices 102, 104.

At block 116, the user device(1) 102 may capture the response image using the camera. The response image may be stored in memory and decoded to extract the information within the response image. In this embodiment, the user device(1) 102 may capture the quick response code response and decode the information embedded within the quick response code response. The information may include the display and camera capabilities of the user device(2) 104.

At block 118, the user device(1) 102 may generate a low visibility quick response code image based, at least in part, on the capabilities of the user devices 102, 104. The low visibility image may be reduced in size, have lower brightness, and/or higher resolution that may make it more difficult for an eavesdropper to see view or capture the low visibility image. The low visibility image may also include a designated display location to make limit the line of sight of a potential eavesdropper.

At block 120, the user device(1) 102 may display the low visibility image on the display screen. In one embodiment, the image may be located at the center of the display screen. In other embodiments, the image may be displayed at another location (e.g., corner, edge, off-center) as needed to limit the line of sight of the image.

At block 122, the user device(2) 104 may capture the low visibility quick response code image using the camera. The user device(2) may store and decode the low visibility image and may provide an acknowledgment of receipt and decoding to the other user device(1) 102 either using another quick response code image or communicating over an electrical communication system.

Although method 100 illustrates one interchange of images between the user device 102, 104. The techniques or operations described in FIG. 1 may be repeated as needed to meet the communication needs of the user devices 102, 104.

Figure 2:
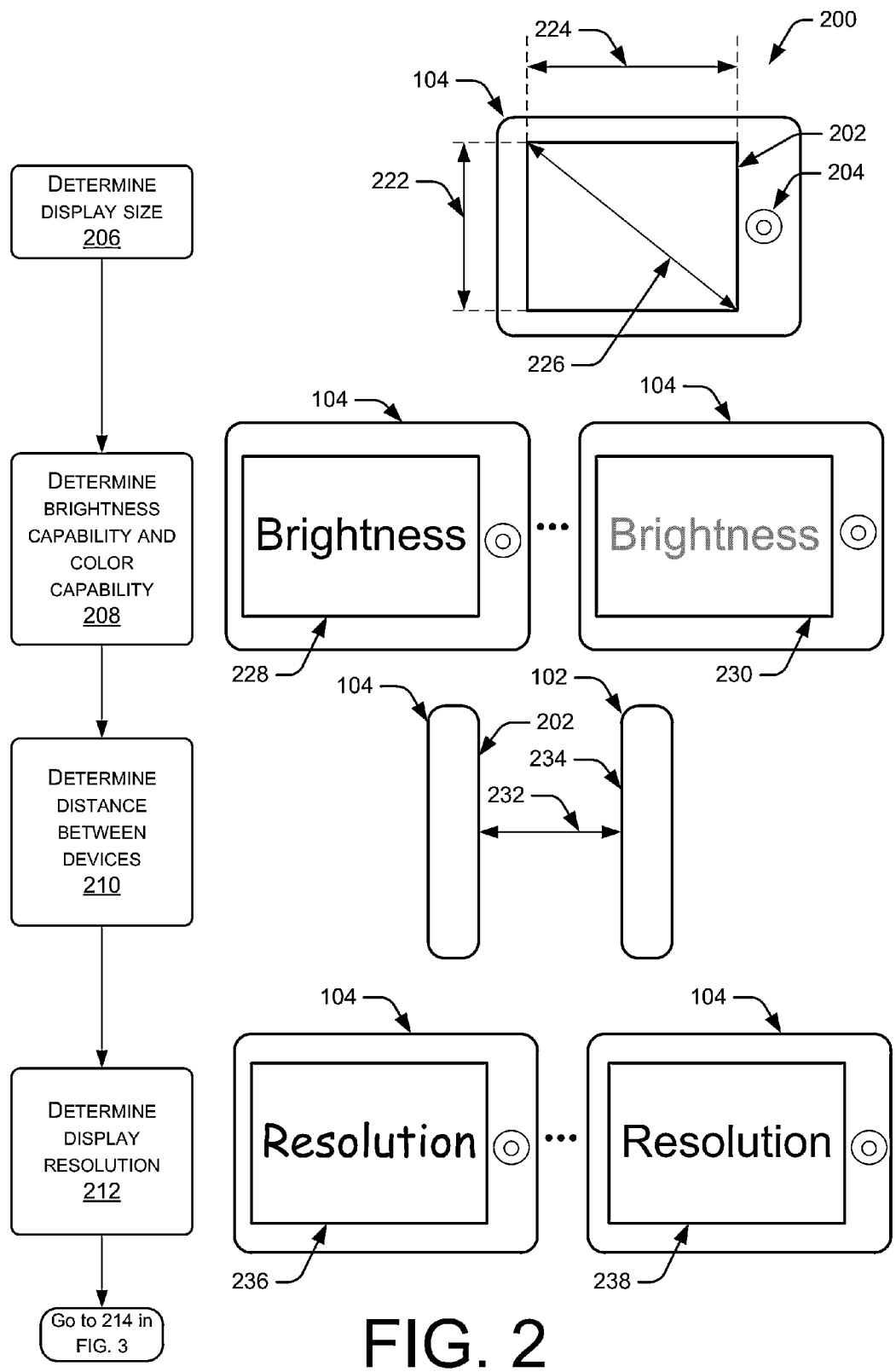
FIGS. 2 and 3 illustrate a flow diagram for a method for determining user device capabilities to display and capture an image in accordance with one or more embodiments of the disclosure.
Figure 3:
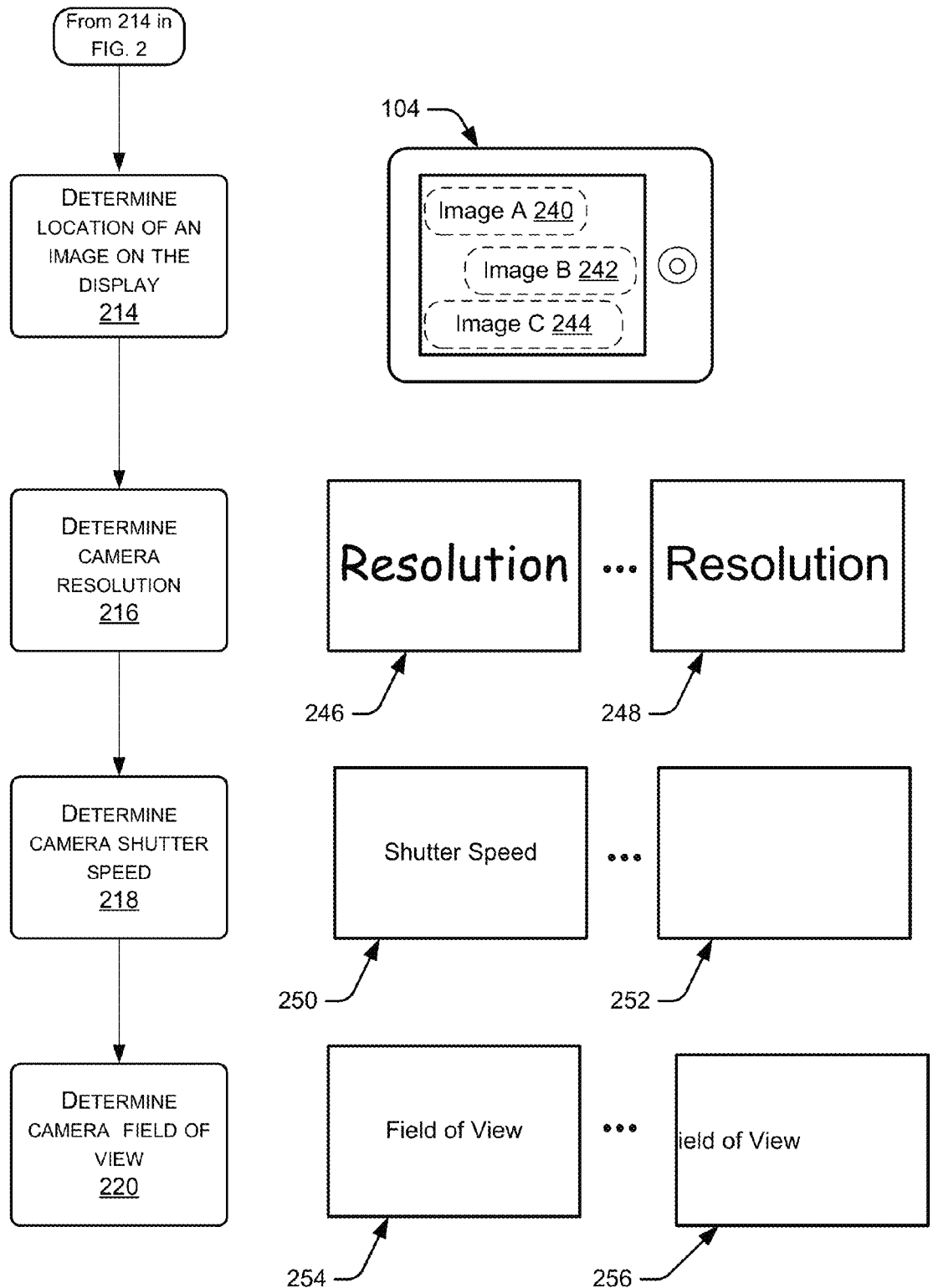

FIGS. 2 and 3 illustrate a flow diagram for a method 200 for determining user device capabilities to display and capture an image that may be encoded with information that may be exchanged between the user devices 102, 104. The method 200 may begin near the top of the flow diagram and may proceed downward towards the bottom of the flow diagram. Illustrations adjacent to the flow diagram blocks may illustrate one or more concepts related to the operations described with respect to the blocks. FIGS. 2 and 3 may illustrate the capabilities of the display screen 202 and the camera 204 of the user devices 102, 104. The method 200 is taken from the perspective of the user device(2) 104 that is determining the capabilities of the user device(1) 102. In another embodiment, the user device(1) 102 may use similar techniques to determine the capabilities of user device(2) 104. It should be noted that in other embodiments the sequencing of the method 200 may be altered and some operations may be omitted.

At block 206, the user device(2) 104 may determine the size of the display screen 202. The size may be based on the height 222 and width 224 of the display screen 202. The size information may be provided by the user device(1) 102 via a network connection or the user device(2) 104 may look up the information based on the model and type.

The size may also be based on the diagonal dimension 226 and the aspect ratio (not shown) of the display screen 202. The aspect ratio may indicate the proportional relationship between the width and height of the display screen 202. The 4:3 and 16:9 ratios are two examples of an aspect ratio that may convert the diagonal dimension 226 into the height 222 and the width 224 of the display screen 202. For example, for a 4:3 aspect ratio the diagonal dimension of 20" may convert to a height of 30.48" and width of 40.64" for the display screen 202. For a 16:9 aspect ratio the diagonal dimension of 20" may convert to a height of 24.9" and width of 44.27" for the display screen 202. The diagonal dimension 226 and the aspect ratio may vary beyond the provided examples.

At block 208, the user device(2) 104 may determine the brightness capability of the display screen 202. The brightness information may be provided by the user device(1) 102 via a network connection or the user device(2) 104 may look up the information based on the model and type of the user device(1) 102. Brightness may be an indication of how much light may be emitted from the display screen 202. In one instance, brightness may be measured in luminance.

The bright display screen 228 may represent a high level of brightness or luminance using the brightness display that shows the word "brightness" in bold letters. In contrast, the lower brightness display screen 230 may represent a lower brightness or luminance as represented by the transparency of the word "brightness" to indicate a lower brightness level relative to the bright display screen 228. As shown here, the bright display screen 228 may be more pronounced than the lower brightness display screen 230 that appears more translucent or transparent.

Brightness capability may be provided based on a specific brightness value, a brightness value range, or a minimum brightness value and a maximum brightness value. Hence, the user device(2) 104 may use the specific brightness value or values that are within the ranges provided.

At block 210, the user device(2) 104 may determine the distance 232 between other use device(1) 102 when they exchange images. In this embodiment, the display screen 202 for the user device(2) 104 is facing the display screen 234 of the other user device(1) 102.

The distance 232 may be determined or approximated by analyzing an image taken by the user device(2) 104. The distance 232 may be provided by the other user device(1) 102 that may have determined the distance 232 by analyzing an image captured by the camera when the two devices are placed in front of each other. The distance 232 may be used in conjunction with the field of view capability of the camera 204 and the resolution of the image being captured. As the distance 232 varies, the field of view of the camera 204 may vary and the ability to capture high resolution images may also vary. The resolution concept and field of view concept and will be discussed in the descriptions of block 212 and 220.

At block 212, the user device(2) 104 may determine the resolution capability of the user device(1) 102. Resolution is the amount of pixels that may be used to display images on a display screen 202. Pixels may be the smallest addressable or controllable element in the display screen 202. In one instance, the display screen resolution may be described based on the number pixels along the width and height of the display screen 202. In one specific embodiment, the resolution may be 1024×768 in that there are 1024 pixels along the width 224 of the display screen 202 and 768 pixels along the height 222 of the display screen 202. The larger the amount of pixels the higher level of detail may be shown in the image.

The display images may use a collection of pixels to generate an image that may be captured by the other user device (1) 102. The higher the amount of pixels of resolution, the higher level of detail the image may be able to minimize the likelihood of eavesdropping. For example, when the encoded data is embedded in a high resolution image (e.g., the encoded portion is smaller in size) the data may be too small to see from an observer that is farther away than the other user device(1) 102. At greater distances, cameras may not be able to detect the image or capture the image in sufficient detail to be able to intercept the information being sent between the user devices 102, 104.

The lower resolution image 236 illustrates that the image may not have as sharp or as defined as the higher resolution image 238. The lower resolution image 236 may have less definition and may not include image details that may be discernible in the higher resolution image 238.

At block 214, the user device(2) 104 may determine where on the display screen (e.g., the location) the image may be displayed. Images may be placed at various portions of the display screen to limit the sight of an image from eavesdropping. In certain instances, the successive images may be placed in different locations. Changing the location of the image over time will change the line of sight to view the image from an eavesdropper's point of view. The eavesdropper may be able to see a portion of the display screen 202. Hence, changing the location may reduce the eavesdropper's ability to intercept the entire communication exchange. In one specific embodiment, the user device(2) 104 may use three different locations (e.g., image A 240, image B 242, and image C 244). Image A 240 may be at the top of the display screen 202 while image C 244 is positioned at the bottom of the display screen 202. Image B 242 being in the middle of the display screen 202, but is slightly offset from the center of the display screen 202. The images 240, 242, 244 are merely examples of location and size and are not an exhaustive representation of the location or size of the images that may be displayed.

In another embodiment, several images may be displayed on the display screen 202, but one of the images may include encoded information or one of the images may include the designated encoded information while the other images include fake or false flag information. The fake or false flag may include information that may mislead an eavesdropper or may be nonsensical. In a variation on this embodiment, the position of the encoded information may change in successive communications. Multiple images may be displayed at the same time, but the position of the encoded information may rotate positions with the fake images. For example, images may be displayed at all three locations (e.g., image A 240, image B 242, image C 244) at the same time and the location of the non-fake encoded information may be shown at the same location in each time. In another embodiment, the non-fake encoded information may rotate or alternate between the three locations.

At block 216, the user device(2) 104 may determine the camera resolution for the other user device(1) 102. The concept of resolution for display screen was discussed above in block 212; however, in this instance the resolution applies to the camera's ability to capture images in detail. Although the display screen 202 may have high resolution and may display detailed images, when the camera has low resolution the captured images may not be able to discern they level of detail being displayed. The low resolution captured image 246 illustrates a lower level of detail or clarity than illustrated by the high resolution captured image 248 in FIG. 3. In certain instances, the camera's resolution ability may be improved by moving closer to the other user device's (1) 102 display screen. However, the camera resolution may decline as the distance between the user devices 102, 104 increases. Therefore, the camera resolution and the display resolution may be reconciled against each other to ensure that the captured images will have sufficient resolution to capture the information encoded in the displayed images. The distance between the user devices 102, 104 may also mitigate resolution issues when the devices are close together. However, at longer distances, the resolution issues may increase and the user devices 102, 104 may have to compensate by using larger images to compensate for resolution issues.

At block 218, the user device(2) 104 may determine the shutter speed of the other user device's(1) 102 camera. The shutter speed determines how long the camera will take to capture an image. Shutter speed may indicate how long the image has to be displayed to be captured by the user device's (1) 102 camera. When the image is displayed long enough, the captured image may be shown in its entirety as shown in the proper shutter speed image 250 that shows the word "shutter speed." However, when the shutter speed is too long, the image may become blurred due to any movement of the user devices 102, 104. In contrast, when the image display time is faster than the shutter speed, the camera may not capture the image as shown by the blank image 252. The blank image 252 was intending to capture the same image shown in proper shutter speed image 250.

At block 220, the user device(2) 104 may determine the field of view of the other user device's(1) 102 camera. The field of view describes the extent of an area that is observable by the camera or the area that may be captured within an image by the camera. The field of view may be determined by the optics of the camera. The user device(2) 104 may need to verify that the displayed images are within the field of view of the camera. Otherwise, the displayed images may not be captured and the encoded information will not be transferred between the user devices 102, 104. The field of view may be adjusted based on the distance between the user devices 102, 104 during image capturing. The closer the devices the field of view may be smaller, while the larger the distance the field of view may increase. However, this may be balanced against the resolution of the camera since camera resolution may decrease as the distance between the two user devices 102, 104 increases.

The proper field of view image 254 illustrates the camera field of view is aligned with the display screen. In this example, the "field of view" text was placed in the center of the display screen and captured when the field of view for the camera was consistent with the orientation of the display screen. However, the improper field of view image 256 demonstrates what may occur when the field of view is not aligned with the display screen. In this instance, the "ield of view" illustrates that a portion of the image was not captured in its entirety. The "ield of view" is missing the letter "f" at the beginning of the phrase "field of view."

Figure 4:
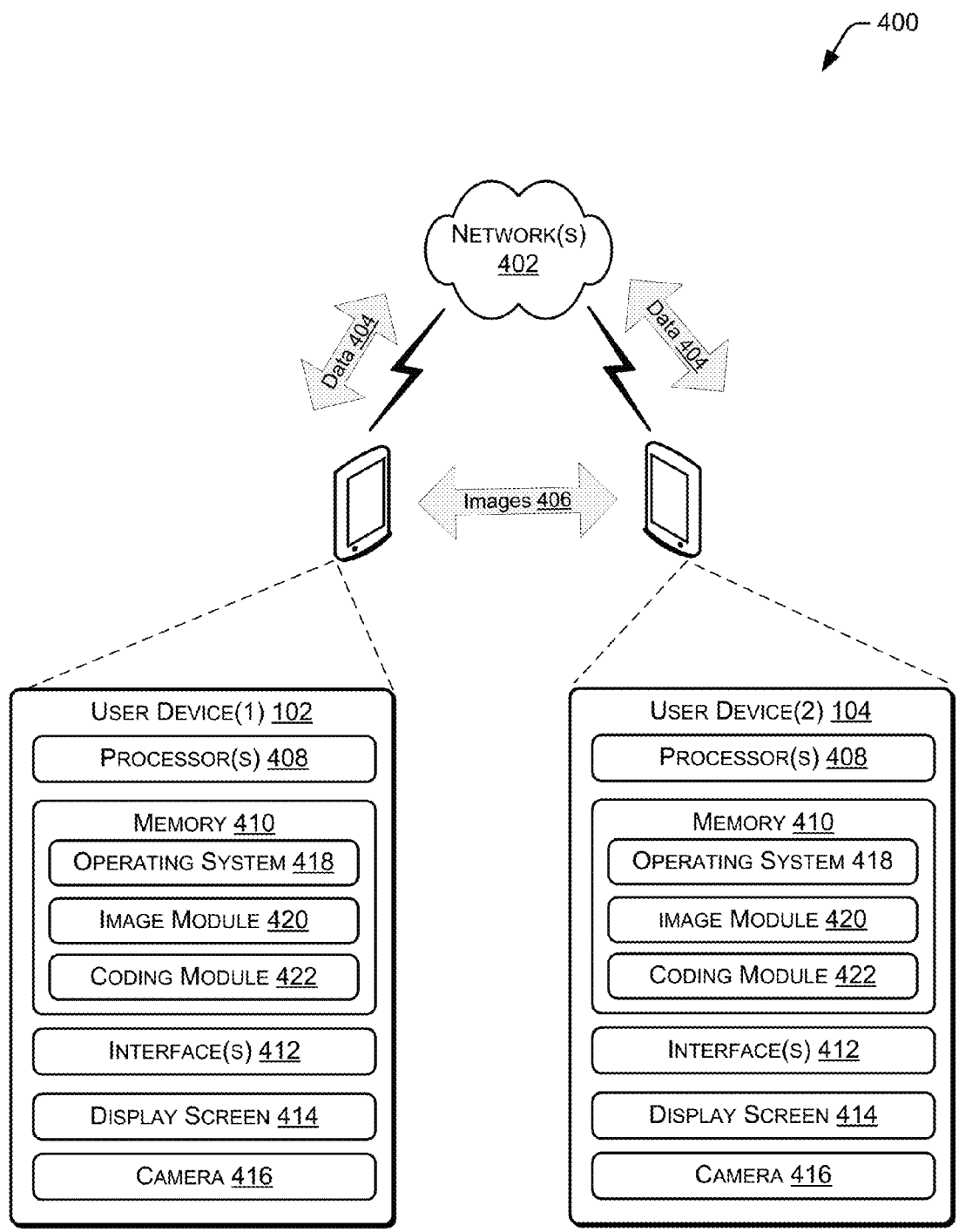
FIG. 4 illustrates a system for sending and receiving information between two user devices by displaying and capturing images in accordance with one or more embodiments of the disclosure.

FIG. 4 illustrates a system 400 for sending and receiving information between two user devices 102, 104 by displaying and capturing images using their cameras and display screens. In this embodiment, the user devices 102, 104 may exchange information using a network 402 or by capturing images displayed on their respective display screens. IN this embodiment, data or information 404 may be exchanged over an electrical network 402 or by sharing images 406.

In this embodiment, the user devices 102, 104 may be configured similarly with respect to hardware, software, and/or any combination thereof. However, in other embodiments, the user devices 102, 104 may not share a similar configuration. With regard to the description of the user devices 102, 104, the same terms may be used to describe the features, functions, and capabilities of the user devices 102, 104 just by referencing user device 102 or user device(1) 102. However, the features, functions, and capabilities described for user device(1) 102 may also apply to user device(2) 104.

The user device 102 may include one or more computer processors 408, a memory 410, one or more interfaces 412, a display screen 414, and a camera 416.

The computer processors 408 may comprise one or more cores and are configured to access and execute (at least in part) computer-readable instructions stored in the one or more memories 410. The one or more computer processors 408 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 408 and one or more of the other components of the user device 102. In certain embodiments, the user device 102 may be based on an Intel® architecture or an ARM® architecture and the processor(s) 408 and chipset may be from a family of Intel® processors and chipsets. The one or more processors 408 may also include one or more application-specific integrated circuits (ASICs) or application-specific standard products (ASSPs) for handling specific data processing functions or tasks.

The interfaces 412 may also comprise one or more communication interfaces or network interface devices to provide for the transfer of data between the user device 102 and another device directly such as in a peer-to-peer fashion, via an electrical network (not shown), or both. The communication interfaces may include, but are not limited to: personal area networks ("PANs"), wired local area networks ("LANs"), wireless local area networks ("WLANs"), wireless wide area networks ("WWANs"), and so forth. The wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the user device(1) 102 and another device such as an access point, a host computer, a server, a router, a reader device, another user device(2) 104, and the like. The network may include, but is not limited to: the Internet, a private network, a virtual private network, a wireless wide area network, a local area network, a metropolitan area network, a telephone network, and so forth.

The display screen 414 may display images in varying degrees of resolution, contrast, content, and/or location for the other user device(2) 104 to capture and analyze for encoded information. The display screen 414 may be, but is not limited to, a liquid crystal display, light emitting diode display, a plasma display, a lenticular display, an e-ink display, or an active matrix organic light emitting diode display. The display screen 414 may include several different aspect ratios and the height and width of the display screen 414 may vary between user device types. The resolution or pixel density may also vary between device types. User devices within higher resolution may have higher pixel density and those with lower resolution may have lower pixel density. The concept of resolution and pixels are described above in the description of FIGS. 2 and 3.

The camera 416 may be used to capture images displayed by the user device(2) 104. As noted above, in the description of FIG. 3, the camera may vary in resolution, field of view, and/or shutter speed. The camera may capture one or more images displayed on the display screen of the other user device(2) 104. At least one of the images may include encoded information (e.g., quick response code) that may be decoded to provide instructions or content for the user device (2) 102. The camera 416 may include, but is not limited to, charge coupled device (CCD) camera, a complementary metal oxide semiconductor (CMOS) image sensor camera, an infrared camera, or an optical lens camera.

The one or more memories 410 comprise one or more computer-readable storage media ("CRSM"). In some embodiments, the one or more memories 410 may include non-transitory media such as random access memory ("RAM"), flash RAM, magnetic media, optical media, solid state media, and so forth. The one or more memories 410 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 410 may store an operating system 418 that includes a plurality of computer-executable instructions that may be implemented by the processor 408 to perform a variety of tasks to operate the interface(s) 412 and any other hardware installed on the user device 102. The memory 410 may also include: a negotiation module 420 and a coding module 422.

The image module 420 may determine the type of images that may be displayed to facilitate the transfer of information between the user devices 102, 104. The image module 420 may receive or provide the display screen 414 and camera 416 capabilities and determine, as noted in FIGS. 2 and 3, which type of resolution, brightness, display time, display location or orientation of the image. The image module 420 may balance the capabilities of each device to enable each user device 102, 104 to be able to display and capture images that enable the transfer of information between the user devices. In one embodiment, the user device(1) 102 may provide and receive the capability information over the network 402 prior to exchanging information via imaging. In another embodiment, the image module 420 may initiate test images to confirm that the user devices 102, 104 are able to display and capture the images so that the encoded information may be processed and read properly.

The image module 420 may generate a low visibility image that minimizes the ability of an eavesdropper to intercept or see the image on the display screen 414. This may include, but is not limited to, lowering the brightness of the display screen 414, decreasing the size of the image, increasing the resolution of the image, and/or locating the image so that the line of sight of eavesdroppers is limited. The low visibility image may be designed in view of the user device 102, 104 capabilities, such that the two user devices 102, 104 are able to exchange images without eavesdroppers being able to capture the images. In another instance, the low visibility image may be generated to limit the eavesdropper's ability to detect the encoded information when the image is seen or captured by the eavesdropper. For example, the encoded image may be large enough for the user devices 102, 104 to detect the encoded information, but small enough that an eavesdropper may not detect the encoded information when the eavesdropper can see or capture the image.

The images may be any type of image that may be encoded with information that is detectable or displayable by the user devices 102, 104. The images may include quick response codes or bar codes which are images that are designed for embedded information. However, generic images may also be encoded with information that is detectable by the user devices 102, 104. For example, information may be embedded in an ordinary picture taken by the camera or downloaded from the network 402. Any type or style of image may be used that may be displayed on the display screen 414, captured by the camera 416, and the information decoded by the coding module 422.

The coding module 422 may encode or decode information into images that are shared between the user devices 102, 104. The encoding may include, but is not limited to, bar coding, binary, quick response code, multi-bit encoding (e.g., ASCII). The images may include two or three dimensional bar codes, pictures, or any other type of image that may be displayed on a display screen 414.

Figure 5:
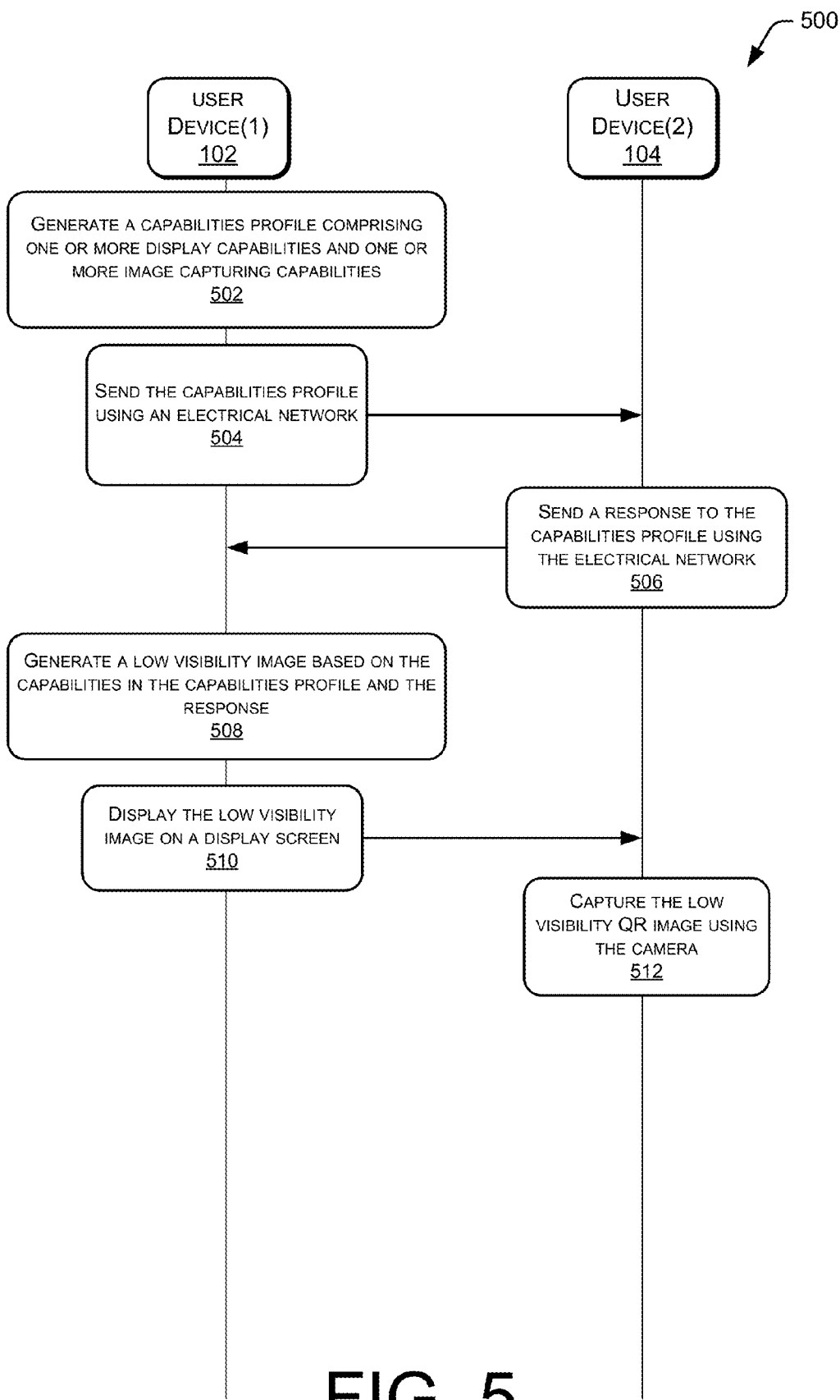
FIG. 5 illustrates a flow diagram for a method for sending and receiving device image capability information using an electrical communication system and then sending and receiving information using images in accordance with one or more embodiments of the disclosure.

FIG. 5 illustrates a flow diagram for a method 500 for sending and receiving device image capability information using an electrical communication system and then sending and receiving information using images between two user devices 102, 104. The method 500 may begin near the top of the flow diagram and may proceed downward towards the bottom of the flow diagram. The relative position of the flow diagram blocks may indicate the sequence of the method 500. The blocks closer to the top of the flow diagram may indicate that they are performed or executed before the blocks below them. It should be noted that in other embodiments the sequencing of the flow diagram 500 may be altered and some operations may be omitted.

At block 502, the user device(1) 102 may generate a capabilities profile that may include the capabilities of the display screen 414 and the camera 416. The display screen capabilities may include the display screen resolution, size, brightness, or any other capabilities or functional operation that may be performed by the display screen 414. The camera capabilities may include, but are not limited to, camera resolution, shutter speed, field of view, or any other characteristic or function associated with the camera 416.

At block 504, the user device(1) 102 may send the capabilities profile to the other user device(2) 104 over a network 402 using an electrical communications device that may transmit an electrical signal over a wire or transmit electromagnetic radiation with a frequency that is outside the visible light spectrum.

At block 506, the user device(2) 104 may receive the capabilities profile and prepare a response that may include the capabilities of the camera and display screen of the user device(2) 104. The user device(2) 104 may send that response to the user device(1) 102 over the network using an electrical communications device that may transmit an electrical signal over a wire or transmit electromagnetic radiation with a frequency that is outside the visible light spectrum.

At block 508, the user device(1) 102 may generate a low visibility image based, at least in part, on the capabilities of each user device 102, 104. The low visibility image may be based, at least in part, on the resolution, brightness, and/or size of the display screen 414 and the resolution, field of view, shutter speed of the camera 416. In general, there is a balance between the ability of the display screen 414 to display a low visibility image and the ability of the camera 416 to capture the image in enough detail to accurately detect the encoded information embedded in the image. The user device(1) 102 may determine the smallest size of the image or the smallest size of the displayed encoded information that is displayable on the screen and detectable by the camera of the other user device(2) 104. The user device(1) 102 may also determine the level of brightness that enables the camera of other user device(2) 104 to detect the encoded information. In this instance, the lower the brightness level, the less likely an eavesdropper may be able to see the image or detect the information embedded in the image. The user device(1) 102 may also determine the displayed location of the encoded image based, at least in part, on the size of the display screen 414 and the field of view of the camera 416 on the other user device(2) 104. This aforementioned determination is balanced upon the ability of the image to be in the field of view of the camera and limiting the line of sight of the image to eavesdroppers. This determination may also be dependent upon the distance between the two user devices 102, 104 during image sharing. The closer the user devices 102, 104 are to each other the field of view becomes limited and the location of the image on the display screen 414 is also limited. This may also influence the sizing of the image, such that the image may also need to be sized properly to fit within the field of view. Another variable of the low visibility image is the shutter speed of the camera 416. The shutter speed may determine how long the image may be displayed on the display screen 414. The faster the shutter speed means the image may be displayed for a shorter period of time to minimize the chance of eavesdropping. The longer the image is displayed; the eavesdropper may have a greater likelihood to intercept the image. In general, the user device(1) 102 may optimize all of the parameters to generate a low visibility image or use one or more of the parameters to generate a low visibility image.

At block 510, the user device(1) 102 may display the low visibility image on the display screen 414. As noted above, the image may be of any type, but in one specific embodiment, the image may be a quick response code.

At block 512, the user device(2) 104 may capture the image displayed on the display screen 414 and begin decoding the information embedded in the image or quick response code.

Figure 6:
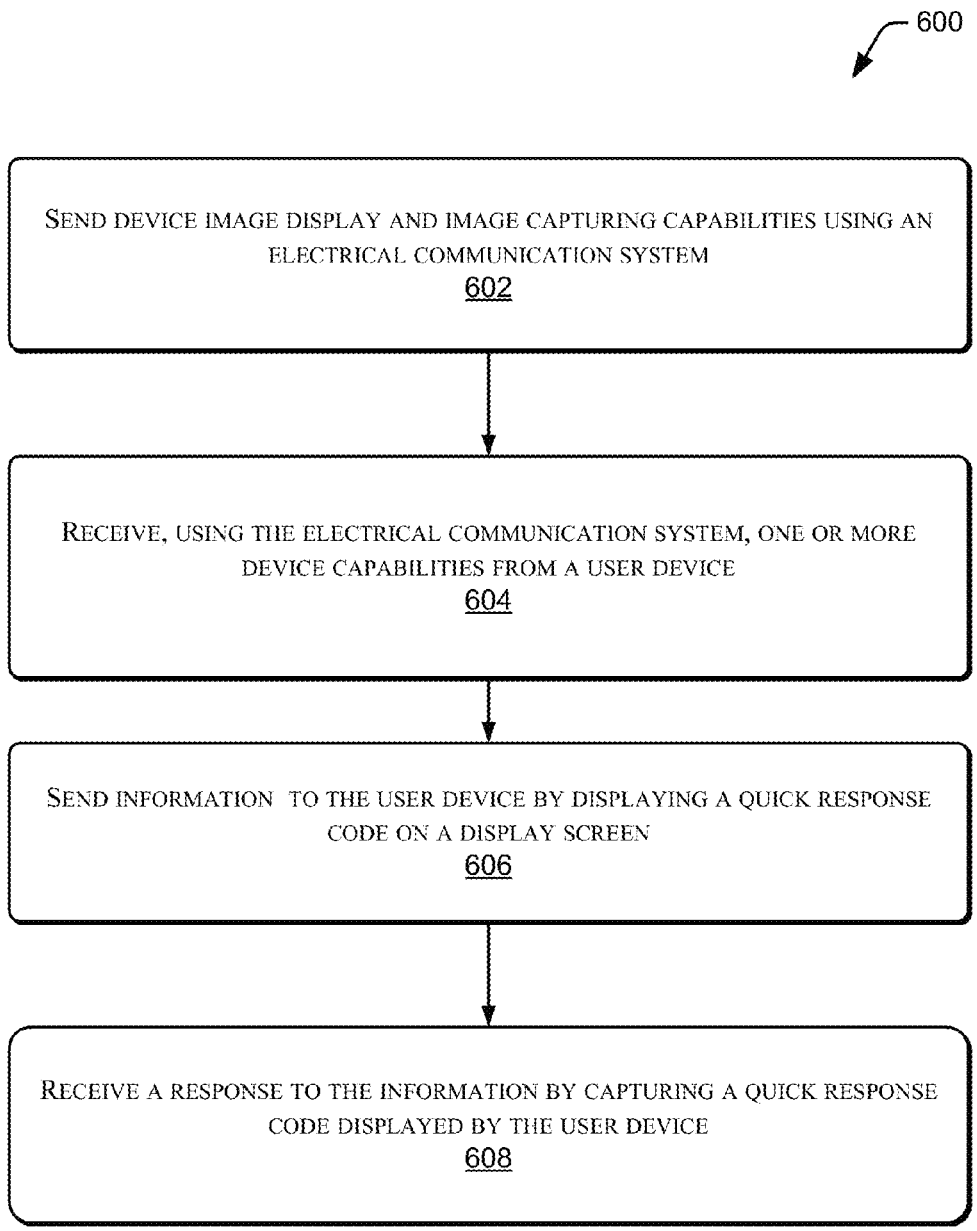
FIG. 6 illustrates a flow diagram for a method for using an electrical communication system to establish communications between two user devices using a display screen and a camera in accordance with one or more embodiments of the disclosure.

FIG. 6 illustrates a flow diagram for a method 600 for using an electrical communication system to establish communications between two user devices 102, 104 using a display screen 414 and a camera 416. Method 600 illustrates one embodiment from the prospective of the user device(1) 102 generating and displaying an image the includes encoded information. It should be noted that in other embodiments the sequencing of the method 600 may be altered and some operations may be omitted.

At block 602, the user device(1) 102 may use an electrical communication system to share display screen 414 and camera 416 capabilities or system information with the other user device(2) 104. The system information may include, but is not limited to, a size for the display screen 414, brightness capability of the display screen 414, resolution capability of the display screen 414, a location or area available for displaying an image on the display screen 414, a field of view for the camera 416, a shutter speed for the camera 416, or a resolution capability for the camera 416. In certain instances, the system information may include specific values, ranges, or maximums and minimums for one or more of the capabilities described. For example, the resolution, brightness, and/or any of the other terms may include threshold amounts that may not be exceeded or fall under depending on the circumstance.

At block 604, the user device(1) 102 may receive the system information from the other user device(2) 104 using the electrical communication system. The system information may include at least a portion of the system information described above in the description of block 602. The user device(1) 102 may also determine the distance between the two user devices 102, 104.

The user device(1) 102 may then determine the display characteristics of the image that will be encoded with information and shared with the user device(2) 104. The location for the image on the display screen 414 may be determined based, at least in part on the field of view of the camera of the other user device(1) 102 or the distance between the user devices 102, 104. The location may also be based, at least in part, on the limiting the line of sight of the image from eavesdroppers. This may include placing the image in the center of the display or a far edge or corner of the display.

The user device(1) 102 may also determine a size for the image on the display screen based, at least in part, on resolution and/or field of view for the camera 416 of the user device 102(2) 104. Brightness may also be determined based on the size and resolution of the image in consideration of the camera's ability to capture the image and to detect the encoded information.

The user device(1) 102 may also determine how long to display the image on the display screen 414. This duration of time may be determined based, at least in part, on the shutter speed of the camera 416 of the other user device(2) 104.

As noted in the description of FIG. 5, the user device(1) 102 may also generate a low visibility image to minimize the risk of eavesdroppers intercepting the image. The low visibility image is based, at least in part, a balancing of one or more capabilities of the display screen 414 that displays the image and the camera 416 that captures the image.

At block 606, the user device(1) 102 may send information embedded in the image by displaying the image on the display screen 414. The image may be captured by the camera of the other user device(2) 104 and may be processed to decode the embedded information in the image. The two user devices 102, 104 may be placed adjacent to each other, such that the display screen of the user device(1) 104 is within the field of view of the camera 416 of the other user device(2) 104. The user device(1) 102 may display the image for a period of time and the other user device(2) 104 may capture the image using the camera 416. The other user device(2) may decode the information embedded within the image and prepare a response that will be displayed on the display screen 414 of the other user device(2) 104.

At block 608, the user device(1) 102 may receive information from the other user device(2) 104 based, at least in part, on capturing (using a camera 416) an image displayed by the user device(2) 104. The user device(1) 102 may decode the information embedded within the image and may use the instructions or content as needed or as directed in the instructions. The information may include a variety of computer-readable instructions or content. In one instance, the information may be of a secure nature that the users may not want others to intercept. For example, the information may include an encryption key that the user devices 102, 104 may use to secure their electrical (e.g., wireless Wi-Fi, wired, peer-to-peer networks) communications. In another embodiment, the information may include payment information (e.g., credit card numbers, bank account information . . . etc.) that is exchanged between the two user devices 102, 104. In one specific embodiment, one of the user devices 102, 104 may be a point of sale device at a store that a user is attempting to purchases goods or services. The point of sale device may query the user device(1) 102 for payment information using the electrical communication system. The user device(1) 102 may send the payment information by displaying an image that has the payment information encoded into the image. The point of sale device may capture the image using a camera 416 and decode the payment information and authorize the sale when the payment information is valid.

In another embodiment, the user devices 102, 104 may be a part of an identity authentication system that grants access based on the information embedded in the images. For example, an employer may control access to their office space by installing a challenge and response system that verifies an employee's identity before granting access to the office. The employee may use their smart phone and the employer may install a camera and display screen at the point of access. The employee may place their phone near the camera and display their identification image on the display screen. The camera may capture the image and decode the information embedded in the image to verify the employee's identity. In another embodiment, the system may send an image to the employee's phone that includes information encoded in the image to ask the employee a question to verify their identity. The employee may read the question and enter a response into their phone. The response may be encoded into an image that is displayed to the camera. When the response is deemed authentic, the employee may be given access to the office. In another instance, this challenge and response technique described above may be used to grant access to other secure areas or equipment (e.g., network access, computer access, website . . . etc.).

Figure 7:
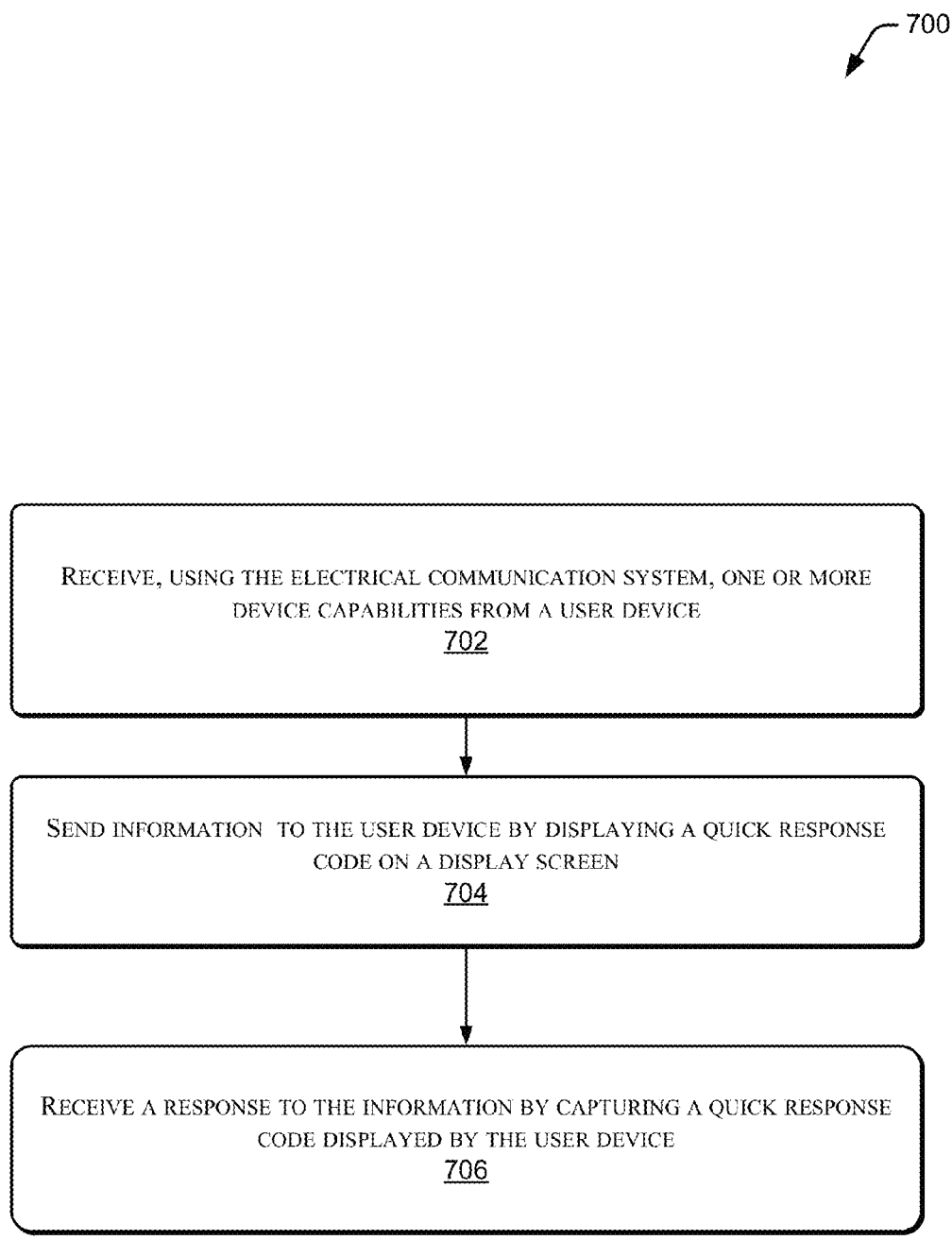
FIG. 7 illustrates a flow diagram for a method for receiving image communication capabilities to establish communication between two user devices using a display screen and a camera in accordance with one or more embodiments of the disclosure.

FIG. 7 illustrates a flow diagram for a method 700 for receiving image communication capabilities to establish communication between two user devices using a display screen and a camera. Method 700 illustrates one embodiment from the prospective of the user device(2) 104 for capturing an image the includes encoded information. In this embodiment, the transfer of user device(1) 102 capability information occurs without the user device(2) 104 sending its capability information back to the user device(1) 102. The user device(2) 104 may display a image for the other user device (2) 102 to capture without knowing the capabilities of the user device(1) 102. It should be noted that in other embodiments the sequencing of the method 700 may be altered and some operations may be omitted.

At block 702, the user device(2) 104 may receive user device information comprising one or more capabilities of the user device. In one instance, the user device information may be received over an electrical communication system (e.g., wireless Wi-Fi, wired) that is communication with another user device(1) 102. The information may include the capabilities of the display screen 414 and the camera 416 on the user device(1) 102. The information may be used to determine what types of images the user device(2) 104 should generate to communicate with the other user device(1) 102 using images embedded with encoded information. The images may be generated a similar manner as described above in the description of FIG. 6. However, in this embodiment, the user device(2) 104 may not send its display screen or camera capabilities to the other user device(1) 102.

At block 704, the user device(2) 104 may send information to the user device(1) 102 using the display screen 414. The information may be transferred by displaying an image on user device(2) 104 that includes encoded information and capturing the image using a camera on user device(1) 102. The image may be analyzed to detect the encoded information and then the user device(1) 102 may decode the information. As noted above, the information may include computer-readable instructions and/or content that may be processed or displayed by the user device(1) 102. In this embodiment, the user device(1) 102 may provide a response to the information. The user device(1) 102 may generate an image that may be displayed to the user device(2) 104. The image may include encoded information that may include computer-readable instructions or content. In one specific embodiment, the information may include authentication credentials to access a secure area.

At block 706, the user device(2) 104 may receive the response information from the user device(1) 102 by using a camera 416. The response information may be encoded within the image captured by the camera 416. The information may include the authentication credentials that the user device(2) 104 may validate. If the authentication credentials are validated, the user device(2) 104 may grant access to the secure area.

Figure 8:
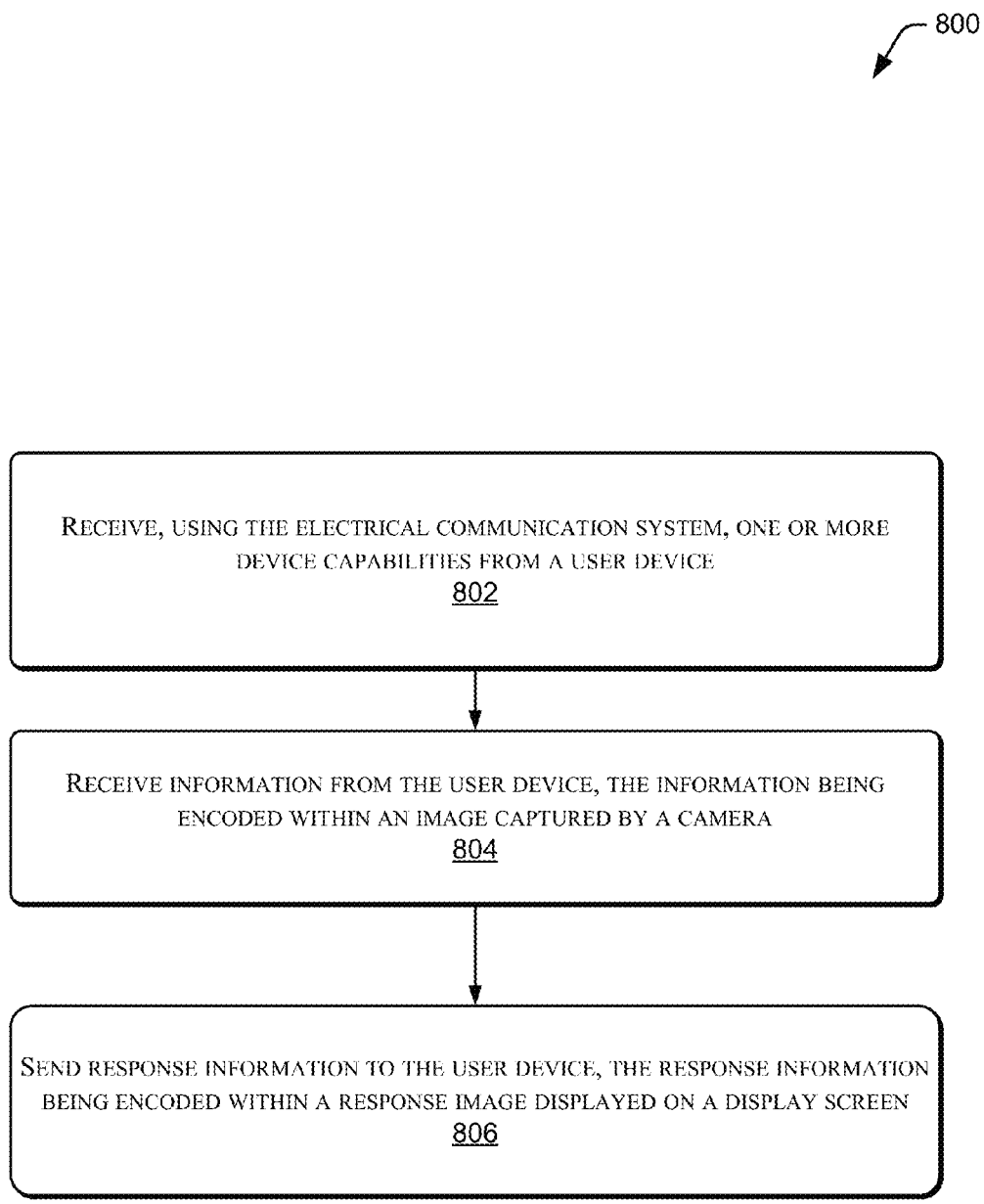
FIG. 8 illustrates a flow diagram for another method for receiving image communication capabilities to establish communication between two user devices using a display screen and a camera in accordance with one or more embodiments of the disclosure.

FIG. 8 illustrates a flow diagram for another method 800 for receiving image communication capabilities to establish communication between two user devices using a display screen 414 and a camera 416. Method 700 illustrates one embodiment from the prospective of the user device(2) 104 for capturing an image the includes encoded information. In this embodiment, the transfer of user device(1) 102 capability information occurs without the user device(2) 104 sending its capability information back to the user device(1) 102. The user device(2) 104 may capture an image displayed by the other user device(2) 102 without knowing the capabilities of the user device(1) 102. It should be noted that in other embodiments the sequencing of the method 700 may be altered and some operations may be omitted.

At block 802, the user device(2) 104 may receive user device information comprising one or more capabilities of another user device(1) 102. The information may be received using an electrical communication device. The capability information may include, but is not limited to, the capabilities of a display screen 414 and a camera 416 incorporated into the user device(1) 102. As noted above in FIGS. 2 and 3, the display screen 414 may include resolution, brightness, and display screen size capabilities and the camera 416 may include resolution, shutter speed, and/or field of view capabilities. The user device(2) 104 may use the capability information to configure its own camera to capture images displayed on the other user device(1) 102.

At block 804, the user device(2) 104 may receive information from the user device using an image capture device (e.g., camera 416). The information being encoded within an image captured by the image capture device. The information may be decoded and may include computer-readable instructions that may be processed by the user device(1) 104. The processing may include processing a response to the information received from user device(1) 102.

At block 806, the user device(2) 104 may send the response information to the user device(1) 102 using an image display device (e.g., display screen 414). The response information may encoded within a response image that was displayed by the user device(2) 104.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one image capture device to capture images displayed by a mobile user device comprising an image display device and another image capture device;
   at least one display screen;
   at least one memory for storing computer-executable instructions; and
   at least one processor configured to access the at least one image capture device, the at least one display screen, the at least one memory and to execute the computer-executable instructions to:
      send, using the display screen to display a quick response image, system information encoded into the quick response image;
      receive, using the image capture device to capture a capability quick response image, mobile user device information encoded in the capability quick response image;
      determine a distance between the system and the user device;
      generate a quick response code based, at least in part, on the system information or the mobile user device information;
      send information embedded in the quick response code by displaying the quick response code on the display screen, the displaying being based, at least in part, on the mobile user device information or the system information; and
      receive information from the mobile user device by capturing, using the image capture device, a quick response code image displayed by the mobile user device, the capturing being based, at least in part, on the mobile user device information or the system information.

2. The system of claim 1, wherein the displaying of the quick response code on the display screen further comprises:

determine a location for the quick response code image on the display screen based, at least in part, on the mobile user device information and the distance between the system and the user device;

determine a size for the quick response code image on the display screen based, at least in part, on the mobile user device information and the distance between the system and the user device;

determine brightness of the quick response code image on the display screen based, at least in part, on the mobile user device information; and determine a resolution of the quick response code on the image on the display screen based, at least in part, on the mobile user device information; and determine an image duration time for the quick response code of the image on the display screen based, at least in part, on the mobile user device information, the image duration time being how long the quick response code will be displayed on the display screen.

3. The system of claim 1, wherein the size of the display screen comprises a length dimension and a height dimension or diagonal dimension.

4. The system of claim 1, wherein:
the brightness capability of the image display device comprises a mobile user device brightness threshold, and
the resolution capability of the image display device comprises a mobile user device resolution threshold.

5. The system of claim 4, wherein the displaying of the quick response code image is based, at least in part, on the mobile user device brightness threshold and the mobile user device resolution threshold.

6. The system of claim 1, wherein:
the system information comprises one or more of the following: a size for the display screen, brightness capability of the display screen, resolution capability of the display screen, a location for the quick response code image on the display screen, a field of view for the image capture device, a shutter speed for the capture device, or a resolution capability for the image capture device; and
the mobile user device information comprises one or more of the following: a size for the image display device, brightness capability of the image display device, resolution capability of the image display device, a location for a quick response code image on the image display device, a field of view for the other image capture device, a shutter speed for the other image capture device, or a resolution capability for the other image capture device.

7. A device, comprising:
at least one image capturing device to capture images displayed by a user device;
at least one display screen;
at least one memory for storing computer-executable instructions; and
at least one processor configured to access the at least one image capture device, the at least one display screen, the at least one memory and execute the computer-executable instructions to:
send, using the display screen to display a first quick response image, system information encoded into the first quick response image;
receive user device information comprising one or more capabilities of the user device, the receiving being based, at least in part, on capturing a capability quick response image displayed by the user device by using the image capture device;
send information to the user device by using the display screen to display a second quick response image encoded with the information, the second quick response image being displayed on the display screen based, at least in part, the one or more capabilities of the user device; and
receive response information from the user device by, using the image capture device to capture a response quick response image displayed on the user device, the response information being encoded within the response quick response image.

8. The device of claim 7, the computer-executable instructions, further comprising, to:
send, performance information of the display screen or the camera to the user device, the performance information being encoded into the capability quick response image that is displayed on the display screen; and
determine a distance between the system and the user device.

9. The device of claim 8, wherein the response is captured by the image capture device based, at least in part, on the performance information and the distance between the system and the user device.

10. The device of claim 7, wherein the image capture device comprises an optical camera, charge coupled device camera, a complementary metal oxide semiconductor image sensor camera, or an infrared image capture device.

11. The device of claim 7, wherein the information comprises an encryption key or payment service information.

12. A method comprising:
sending, using a display screen to display a first quick response image, system information to a user device, the system information being encoded in the first quick response image that is displayed on the display screen;
receiving, using a camera, user device information comprising one or more capabilities of the user device, the user device information being encoded in a capability quick response image that is captured by the camera, and at least a portion of the capability quick response image being displayed by the user device;
sending information to the user device by using the display screen to display a second quick response image encoded with the information, the second quick response image being displayed on the display screen based, at least in part, the one or more capabilities of the user device; and
receiving response information from the user device by using the camera to capture a response quick response image displayed on the user device, the response information being encoded within the response quick response image.

13. The method of claim 12, further comprising receiving, using a radio frequency communication device, user device information comprising one or more capabilities of an image display device of the user device or one or more capabilities of image capture device of the user device.

14. The method of claim 13, wherein the sending of the information is based, at least in part on one or more capabilities of the display screen.

15. The method of claim 12, wherein the information comprises a request for authentication credentials and the response comprises the authentication credentials.

16. A device, comprising:
at least one camera to capture images displayed by a user device;
at least one display screen;
at least one memory for storing computer-executable instructions; and at least one processor configured to access the at least one camera, the at least one display screen, and execute the computer-executable instructions to:
- send, using the display screen to display a first quick response image, system information encoded into the first quick response image;
- receive, using the camera, user device information comprising one or more capabilities of the user device, the receiving being based, at least in part, on capturing a capability quick response image displayed by the user device by using the camera;
- send information to the user device by using the display screen to display a second quick response image encoded with the information, the second quick response image being displayed on the display screen based, at least in part, the one or more capabilities of the user device; and
- receive response information from the user device by, using the camera to capture a response quick response image displayed on the user device, the response information being encoded within the response quick response image.

17. The device of claim 16, wherein the user device comprises a point of sale payment device and the response information comprises payment information.

18. The device of claim 16, wherein the response information comprises an encryption key.

19. The device of claim 16, wherein the response information comprises authentication credentials for a wireless network.

20. The device of claim 16, wherein the one or more capabilities comprise: resolution of the display screen, a dimension of the display screen, shutter speed of the image capture device, or resolution of the image capture device.

21. A non-transitory computer-readable media storing computer-executable instructions that, when executed by at least one processor, configure the at least one processor to perform operations comprising:
- sending, using a display screen to display a first quick response image, system information to a user device, the system information being encoded in the first quick response image that is displayed on the display screen;
- receiving, using a camera, user device information comprising one or more capabilities of the user device, the user device information being encoded in a capability quick response image that is captured by the camera, and at least a portion of the capability quick response image being displayed by the user device;
- sending information to the user device by using the display screen to display a second quick response image encoded with the information, the second quick response image being displayed on the display screen based, at least in part, the one or more capabilities of the user device; and
- receiving response information from the user device by using the camera to capture a response quick response image displayed on the user device, the response information being encoded within the response quick response image.

22. The computer-readable media of claim 21, wherein the image capture device and the image display device operate with a visible spectrum of electromagnetic radiation.

* * * * *